D. SLATE.
Milling-Machines.

No. 146,287. Patented Jan. 6, 1874.

Witnesses:
Chas. H. Smith
Geo. D. Walker

Inventor
Dwight Slate
per Lemuel W. Serrell
atty.

UNITED STATES PATENT OFFICE.

DWIGHT SLATE, OF HARTFORD, CONNECTICUT, ASSIGNOR TO THE STEPHENS PATENT VISE COMPANY, OF NEW YORK, N. Y.

IMPROVEMENT IN MILLING-MACHINES.

Specification forming part of Letters Patent No. 146,287, dated January 6, 1874; application filed April 28, 1873.

*To all whom it may concern:*

Be it known that I, DWIGHT SLATE, of Hartford, in the State of Connecticut, have invented an Improvement in Milling-Machines, of which the following is a specification:

Milling-tools have heretofore been usually mounted upon an arbor or mandrel at the end of a lathe-mandrel, and the outer end of the arbor of the milling-tool has been supported by a center that is screwed up by the lathe-center. In this case, the severe strain to which the milling-tools are subjected is liable to spring the parts, and prevent the milling-tool working true; besides this, the friction causes warmth and expansion in the mandrel that binds the parts in the heads of the lathe.

My invention is made for insuring a reliable support to the shaft or mandrel of the milling-tool, for allowing the parts to expand under change of temperature, and for easily removing one set of milling-tools and substituting another.

I make use of a tubular extension to the mandrel that serves to support such mandrel, and also to clamp the milling-tools upon the arbor or mandrel. This tubular extension is sustained by a journal box or bearing, in which it revolves, and it is free to slide endwise under the varying conditions of temperature, or when being screwed up to clamp the milling-tools, or unscrewed for their removal.

Figure 1:
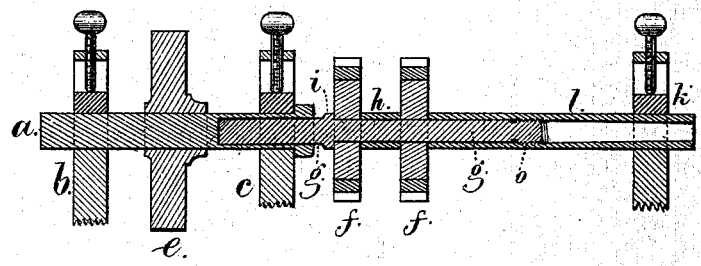
Figure 2:
Figure 3:
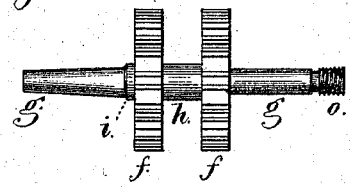

In the drawing, Figure 1 is a vertical longitudinal section of the mandrel, heads, and milling-tools. Fig. 2 is an elevation of the tubular mandrel extension detached; and Fig. 3 is an elevation of the milling-tools and arbor.

The mandrel or shaft $a$ is supported in the heads $b$ and $c$ in the usual manner, the bearings being provided with caps or movable boxes that are adjusted to compensate wear. The pulley $e$ is driven by competent power to revolve the mandrel and the milling-tools $f$ that are upon the arbor $g$. These milling-tools are made with cutters or cutting-edges, adapted to the work to be performed, and are upon the arbor $g$.

If this milling-tool is used upon an ordinary lathe, the arbor $g$ may be of a size at one end to enter the hole at the end of the mandrel $a$, as shown; or the mandrel $a$ and arbor $g$ may be made of one piece of metal.

The collar $i$, upon the arbor $g$, forms a stop, against which one of the milling-tools, $f$, is pressed; or there may be a separate collar between the collar $i$ and the milling-tool, and where two milling-tools are employed there is to be a sleeve, $h$, to keep them at the proper distance apart. At the outer end of the arbor $g$ is a screw, $o$. It usually will be a left-hand thread, and around the arbor $g$ is the tubular extension $l$, made to fit the arbor $g$ closely, and of a length adapted to extend from the milling-tool $f$ through the bearing or journal-box $k$; and this tubular extension has a screw-thread in the inside to screw upon the screw $o$, and thereby clamp the milling-tools firmly to place.

There may be movable sleeves or collars around the mandrel $g$, between the milling-tools and the end of the tubular extension $l$.

It will now be evident that when the tube $l$ is unscrewed and removed, the milling-tools $f$ can be easily taken off for changing them, or for sharpening or repairing the cutters, and when the tube $l$ is screwed upon the mandrel or arbor $g$, it becomes an extension thereof that is adapted to support, strengthen and sustain the arbor when the milling-tools are in operation, and the said arbor is not liable to bind or become injured in operation, either from friction or expansion, under changes of temperature.

The article to be milled may be held and presented to the tools in any desired manner, or the boxes or bearings carrying the mandel, arbor, and sleeve may be movable for the same purpose, and they may be movable in any direction to suit the article operated upon.

I claim as my invention—

The tubular screw-threaded extension $l$, sustained in the journal-box $k$, in combination with the mandrel or arbor and collar $i$, and the milling-tool or tools, substantially as set forth.

Signed by me this 17th day of April, A. D. 1873.

DWIGHT SLATE.

Witnesses:
D. G. GORDON,
BENJ. F. STEPHENS.